(12) United States Patent
Tsuchiya et al.

(10) Patent No.: US 7,781,030 B2
(45) Date of Patent: Aug. 24, 2010

(54) INFRARED SENSOR MANUFACTURING METHOD SUITABLE FOR MASS PRODUCTION

(75) Inventors: Tetsuo Tsuchiya, Ibaraki (JP); Susumu Mizuta, Ibaraki (JP); Yuriko Mizuta, legal representative, Tokyo (JP); Toshiya Kumagai, Ibaraki (JP); Toshihito Sasaki, Tokyo (JP); Seiji Kurashina, Tokyo (JP)

(73) Assignees: National Institute of Advanced Industrial Science and Technology, Tokyo (JP); NEC Corporation, Tokyo (JP)

( * ) Notice: Subject to any disclaimer, the term of this patent is extended or adjusted under 35 U.S.C. 154(b) by 849 days.

(21) Appl. No.: 11/710,962

(22) Filed: Feb. 27, 2007

(65) Prior Publication Data

US 2007/0272863 A1    Nov. 29, 2007

(30) Foreign Application Priority Data

Feb. 27, 2006    (JP)    ............................. 2006-049492

(51) Int. Cl.
*B05D 3/06*    (2006.01)
*G01J 5/00*    (2006.01)
(52) U.S. Cl. ..................... 427/554; 427/553; 250/338.1
(58) Field of Classification Search .................. 427/554
See application file for complete search history.

(56) References Cited

U.S. PATENT DOCUMENTS

| 6,624,384 | B2 | 9/2003 | Tsuchiya et al. | |
| 2001/0028034 | A1* | 10/2001 | Sasaki | 250/338.1 |
| 2002/0139784 | A1* | 10/2002 | Tsuchiya et al. | 219/121.69 |

FOREIGN PATENT DOCUMENTS

JP    2002289931    10/2002

OTHER PUBLICATIONS

Chinese Patent Office issued a Chinese Office Action dated Jun. 19, 2009, Application No. 200710084313.

* cited by examiner

*Primary Examiner*—Timothy H Meeks
*Assistant Examiner*—Collette Ripple
(74) *Attorney, Agent, or Firm*—Young & Thompson

(57) ABSTRACT

An infrared sensor manufacturing method according to this invention includes a step of forming a bridge structure of an insulating material on an Si substrate, a step of forming a vanadium oxide thin film on the bridge structure by a dry film forming method, a step of irradiating laser light onto the vanadium oxide thin film to thereby change material properties thereof, a step of forming the vanadium oxide thin film with the changed material properties into a bolometer resistor having a predetermined pattern, and a step of forming a protective layer of an insulating material so as to cover the bolometer resistor having the predetermined pattern and the bridge structure.

10 Claims, 4 Drawing Sheets

RELATIONSHIP BETWEEN LASER IRRADIATION TIME
AND RESISTIVITY (ROOM TEMPERATURE)

INFRARED SENSOR MANUFACTURING METHOD SUITABLE FOR MASS PRODUCTION

This application claims priority to prior Japanese patent application JP 2006-49492, the disclosure of which is incorporated herein by reference.

BACKGROUND OF THE INVENTION

This invention relates to a method of manufacturing a bolometer-type non-cooling infrared sensor that changes the temperature of a light-incident portion thereof by absorption of incident infrared light so as to change the electrical resistance value of a resistor by the temperature change, thereby outputting a signal indicative of the infrared radiation intensity.

A bolometer utilizes the temperature variation of electrical resistance of a metal or semiconductor thin film that is thermally insulated from a substrate material. Generally, as a temperature coefficient of resistance (hereinafter referred to as a "TCR") of the bolometer material, i.e. the material of the metal or semiconductor thin film, increases, the detection sensitivity is improved and a noise equivalent temperature difference (hereinafter referred to as an "NETD") representing the temperature resolution of the infrared sensor decreases.

An alloy thin film such as a nickel-iron alloy thin film has a small TCR of about 0.5%/K. Therefore, it is considered that a conductive oxide thin film such as a vanadium oxide thin film, a perovskite-type Mn oxide thin film, or a $YBa_2Cu_3O_x$ thin film is preferable as a bolometer resistor film for use in a highly sensitive infrared sensor.

A manufacturing method of an infrared sensor having such a conductive oxide thin film is described, for example, in Patent Document 1 (Japanese Unexamined Patent Application Publication (JP-A) No. 2002-289931).

In the manufacturing method according to Patent Document 1, a bridge structure formed on an Si substrate via a gap, a bolometer resistor film formed on the bridge structure, and a protective layer formed on the surface of the bridge structure including the bolometer resistor film are each formed as an oxide thin film by dissolving a metal-organic compound in a solvent to make a solution, then coating and drying it, and then irradiating it with laser light having a wavelength of 400 nm or less to thereby cut and decompose carbon-oxygen bonds.

It has been confirmed that, according to this manufacturing method, the bolometer resistor film having a predetermined sheet resistance and TCR is obtained by laser annealing for several minutes as compared with a heat treatment method which requires thermal annealing for several hours to several tens of hours.

In the manufacturing method as described above, although an effect is obtained that the number of processes can be reduced by forming the bridge structure, the bolometer resistor film, and the protective layer, respectively, by the coating method, there is a problem that the coating method is not suitable for mass production.

Further, there is room for improvement in TCR with respect to the bolometer resistor film made of vanadium oxide.

SUMMARY OF THE INVENTION

This invention pays attention particularly to the vanadium oxide thin film among the foregoing conductive oxide thin films and aims to provide an infrared sensor manufacturing method that is suitable for mass production and, further, capable of improving the TCR.

According to this invention, a method of manufacturing a bolometer-type infrared sensor is provided. The bolometer-type infrared sensor is that changes a temperature of a light-incident portion thereof by absorption of incident infrared light so as to change an electrical resistance value of a resistor by a temperature change, thereby outputting a signal indicative of a radiation intensity of the incident infrared light. According to an aspect of this invention, the manufacturing method comprises the steps of forming a bridge structure of an insulating material on an insulating substrate, forming a vanadium oxide thin film on the bridge structure by a dry film forming method, and irradiating laser light onto the vanadium oxide thin film to thereby change material properties thereof. The manufacturing method further comprises the steps of forming the vanadium oxide thin film with the changed material properties into a predetermined pattern as the resistor, and forming a protective layer of an insulating material so as to cover the vanadium oxide thin film formed into the predetermined pattern and the bridge structure.

In the manufacturing method according to this invention, the dry film forming method may be one of a sputtering method, a vacuum deposition method, and a CVD method. The bridge structure and the protective layer may be each in the form of one of an SiN thin film and an SiON thin film formed by a CVD method. The use may be made, as the laser light, of laser light having a wavelength of 157 to 550 nm and, preferably, laser light having a wavelength of 222 to 360 nm. It is preferable that an irradiation energy of the laser light is set to 10 to 150 $mJ/cm^2$ and, preferably, 30 to 60 $mJ/cm^2$. It is preferable that irradiation of the laser light is performed at a substrate temperature of 350° C. or less and, preferably, at room temperature. It is preferable that irradiation of the laser light is performed in a vacuum or in a mixed reducing gas atmosphere.

According to another aspect of this invention, an infrared sensor manufactured by the method according to the above-mentioned aspect is provided.

According to the manufacturing method of this invention, it is possible to provide the infrared sensor that is suitable for mass production and, further, capable of improving the TCR.

DESCRIPTION OF THE PREFERRED EMBODIMENT

Figure 1A:
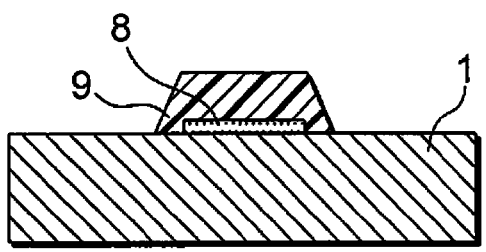
FIGS. 1A to 1E are diagrams for explaining an embodiment of infrared sensor manufacturing processes according to this invention.

Hereinbelow, an infrared sensor manufacturing method according to this invention will be described in detail.

This invention relates to a bolometer-type non-cooling infrared sensor that changes the temperature of a light-incident portion thereof by absorption of incident infrared light and outputs a signal indicative of the incident infrared intensity using the fact that the electrical resistance value of a resistor changes due to the temperature change.

This invention is characterized by forming a bolometer resistor film, through a dry film forming process, on a bridge structure formed on an insulating substrate via a gap and then irradiating laser light under the predetermined conditions onto the resistor film to change the material properties thereof, thereby forming it as a metal oxide film. Herein, "to change the material properties" represents cutting bonds between metal and oxygen atoms forming the metal oxide film to separate oxygen, thereby improving the transfer of electrons in the metal oxide film, i.e. reducing the electrical resistivity.

As the dry film forming process, use can be made of a sputtering method, a vacuum deposition method, or a CVD (Chemical Vapor Deposition) method.

A vanadium oxide thin film is used as the bolometer resistor film. Since the temperature for forming the vanadium oxide thin film is low, i.e. 500° C. or less, there is hardly a problem in manufacturing process.

On the other hand, since the bridge structure and a protective layer, if conductive, affect the detection sensitivity to a change in electrical resistivity of the bolometer resistor film, use is made, as each of them, of an inorganic insulating thin film made of SiN or SiON being an insulator having a large resistance and a high infrared absorptivity.

The thickness of the inorganic insulating thin film may be set to about 0.01 to 1 µm according to the purpose.

The insulating substrate having the vanadium oxide thin film formed on the bridge structure is set in a chamber under vacuum or in a chamber capable of controlling its atmosphere with a mixed reducing gas and the laser light is irradiated onto the vanadium oxide thin film at a predetermined wavelength, intensity, and repetition frequency for a predetermined time. Then, as described above, the material properties of the vanadium oxide thin film change.

As the mixed reducing gas, there is cited $H_2$, $NH_3$, $N_2O$, or the like.

As the laser light, use can be made of ultraviolet laser light with a small heating effect, such as laser light with a wavelength of 157 to 550 nm which is generated by an excimer laser such as XeF (wavelength: 351 nm), XeCl (wavelength: 308 nm), KrF (wavelength: 248 nm), ArF (wavelength: 193 nm), or $F_2$ (wavelength: 157 nm), an Ar-ion laser (second harmonic: 257 nm), or the like. Among them, in terms of the stability and maximum output energy density of the laser, the laser light with a wavelength of 222 to 360 nm is preferable because it can uniformly change the material properties.

With respect to the irradiation energy (density) of the laser light, although the irradiation is enabled with low or high energy by changing the wavelength and can be effectively performed in the range of 10 to 150 $mJ/cm^2$, the range of 30 to 60 $mJ/cm^2$ is preferable.

The irradiation frequency of the laser light is 1 Hz to 2000 kHz, preferably 1 to 100 Hz. This is because, although the pulse frequencies of industrial high-output lasers are normally 1 to 100 Hz, high-frequency lasers, but with low outputs, have been provided in recent years and, as the repetition frequency increases, the high-speed processing is enabled correspondingly.

The pulse width of the laser light is 10 to 200 nsec, preferably 10 to 40 nsec. This is also because although the pulse widths of commercial lasers are normally 10 to 40 nsec, it is becoming possible to change the pulse width.

The irradiation time of the laser light is 1 second to 2 hours, preferably 1 second to 30 minutes. This is because although it is about 10 to 30 minutes with a current laser, it is expected that the irradiation for about 2 hours may be optimal with a low-output laser.

If the irradiation energy of the laser light is too small, there occurs no change in material properties, while, if it is too large, ablation occurs to vaporize the material of the thin film.

It is preferable to heat the insulating substrate to a temperature of 350° C. or less at the time of the laser light irradiation, but the irradiation can be performed at room temperature.

Hereinbelow, a preferred embodiment of an infrared sensor manufacturing method according to this invention will be described with reference to FIGS. 1A to 1E, but this invention is not limited thereto.

EMBODIMENT

As shown in FIG. 1A, a metal such as WSi having a high infrared reflectance was formed into a film, by a sputtering method, on an Si substrate 1 formed with a signal output circuit (not shown), thereby obtaining an infrared reflecting film 8. A conventional technique was used as it was for the formation of the infrared reflecting film 8. Then, a photosensitive polyimide was coated in a region including the infrared reflecting film 8 and then was subjected to patterning by lithography, thereby forming a sacrificial layer 9 having a shape as shown. Instead, a polycrystalline silicon film may be formed on the infrared reflecting film 8 by a CVD method and then be subjected to patterning, thereby forming a sacrificial layer 9 having the shown shape.

Figure 1B:
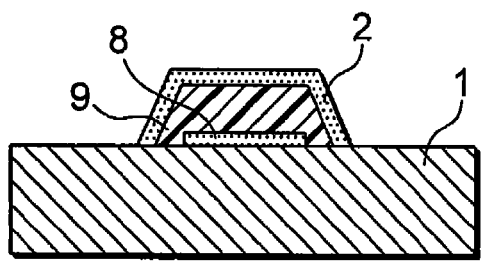

Subsequently, as shown in FIG. 1B, an inorganic insulating film of SiON was formed on the sacrificial layer 9 by a plasma CVD method. This SiON thin film serves as a bridge structure 2.

Figure 1C:
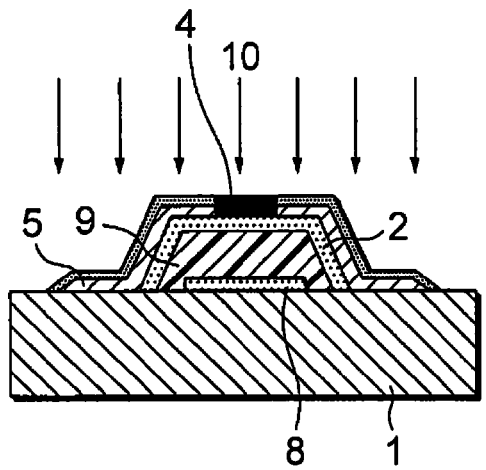

Then, referring to FIG. 1C, a metal such as Ti having a small thermal conductivity was formed into a film on the bridge structure 2 by a sputtering method and then was subjected to normal exposure, development, and etching processes, thereby forming wirings 5. Then, after forming a vanadium oxide thin film 4 on the bridge structure 2 by a sputtering method, XeCl excimer laser light 10 with a wavelength of 308 nm was irradiated onto the entire surface of the thin film 4 at 50 $mJ/cm^2$ and 10 Hz in a vacuum at room temperature for 5 minutes. Then, through exposure, development, and etching processes, a portion of the vanadium oxide thin film 4 with a predetermined pattern, adapted to serve as a bolometer resistor 4' (FIG. 1D), was left remaining on the bridge structure 2 at its portion corresponding to the infrared reflecting film 8. As a result, the bolometer resistor 4' irradiated with the laser light changed in electrical resistivity and TCR.

Figure 1D:
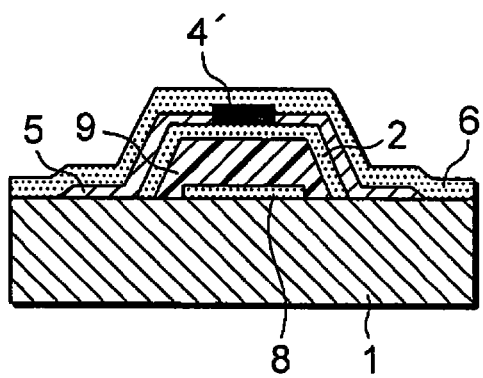

Then, as shown in FIG. 1D, an inorganic insulating thin film of SiON was formed on the bridge structure 2 including the bolometer resistor 4' by a plasma CVD method. This SiON thin film serves as a protective layer 6 adapted to shield the bolometer resistor 4' from the outside.

Figure 1E:
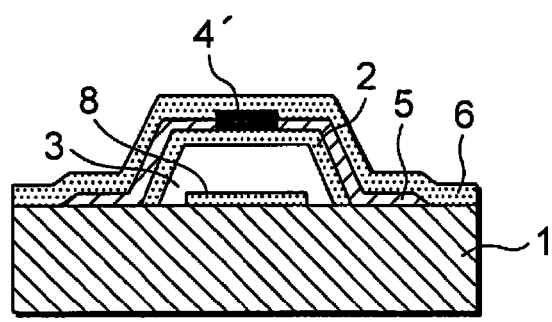

Thereafter, the protective layer 6 was formed with a pattern by exposure and development and there was formed a slit-like groove (not shown) reaching the sacrificial layer 9 by dry etching using a gas. Then, treatment was performed to remove the sacrificial layer 9 through the slit-like groove, thereby forming a gap 3 at a portion where the sacrificial layer 9 had been present (FIG. 1E).

By the forming method as described above, there was formed a diaphragm having a structure with the bolometer resistor 4' floating in the air.

A principle in which the cell obtained by the foregoing manufacturing method operates as an infrared sensor is as follows:

When infrared light is incident on the cell (light-incident portion), the infrared light is absorbed by the protective layer 6 and the bridge structure 2 each having a high infrared absorptivity, while, part of the infrared light is transmitted through the protective layer 6 and the bridge structure 2 and then is reflected by the infrared reflecting film 8 so as to be absorbed by the bridge structure 2 and the protective layer 6. The absorbed infrared light serves to heat the diaphragm to thereby change the resistance of the bolometer resistor 4'. The change in resistance of the bolometer resistor 4' is output as a signal indicative of the infrared radiation intensity through the wirings 5 and the signal output circuit.

Figure 2:
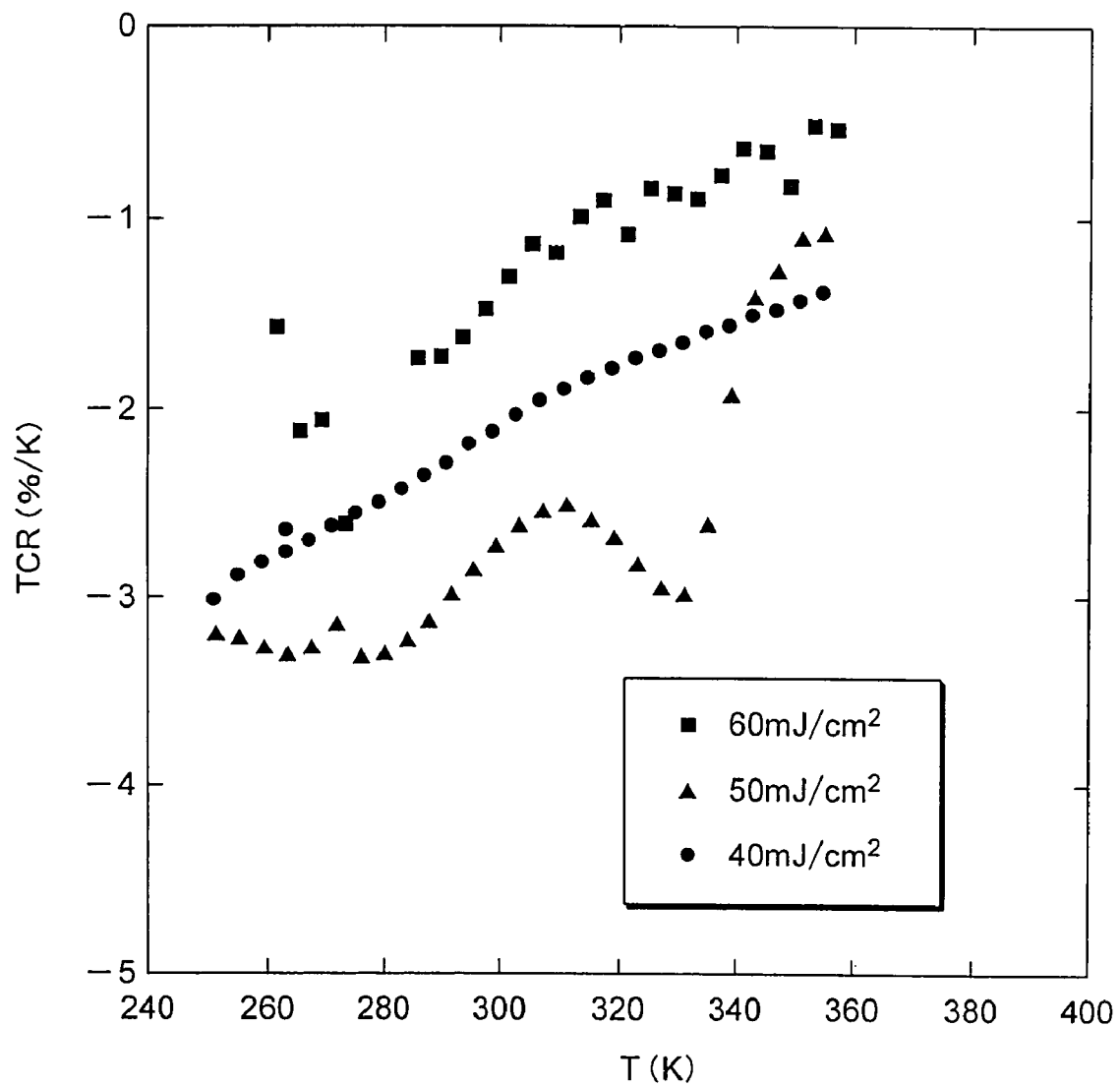
FIG. 2 is a characteristic diagram showing the results of measuring the temperature dependence of TCR of a bolometer resistor in the case where the irradiation energy of laser light irradiated onto the bolometer resistor is changed in the infrared sensor manufacturing process shown in FIG. 1C.

FIG. 2 is a characteristic diagram showing the results of measuring the temperature dependence of TCR of the infrared sensor (bolometer resistor 4') in the case where the irradiation energy of the laser light irradiated onto the bolometer resistor 4' is 40 mJ/cm$^2$, 50 mJ/cm$^2$, and 60 mJ/cm$^2$, respectively. When the irradiation energy is 50 mJ/cm$^2$, a good TCR of about 3%/K exceeding conventional 2%/K is obtained around room temperature (300K).

Figure 3:
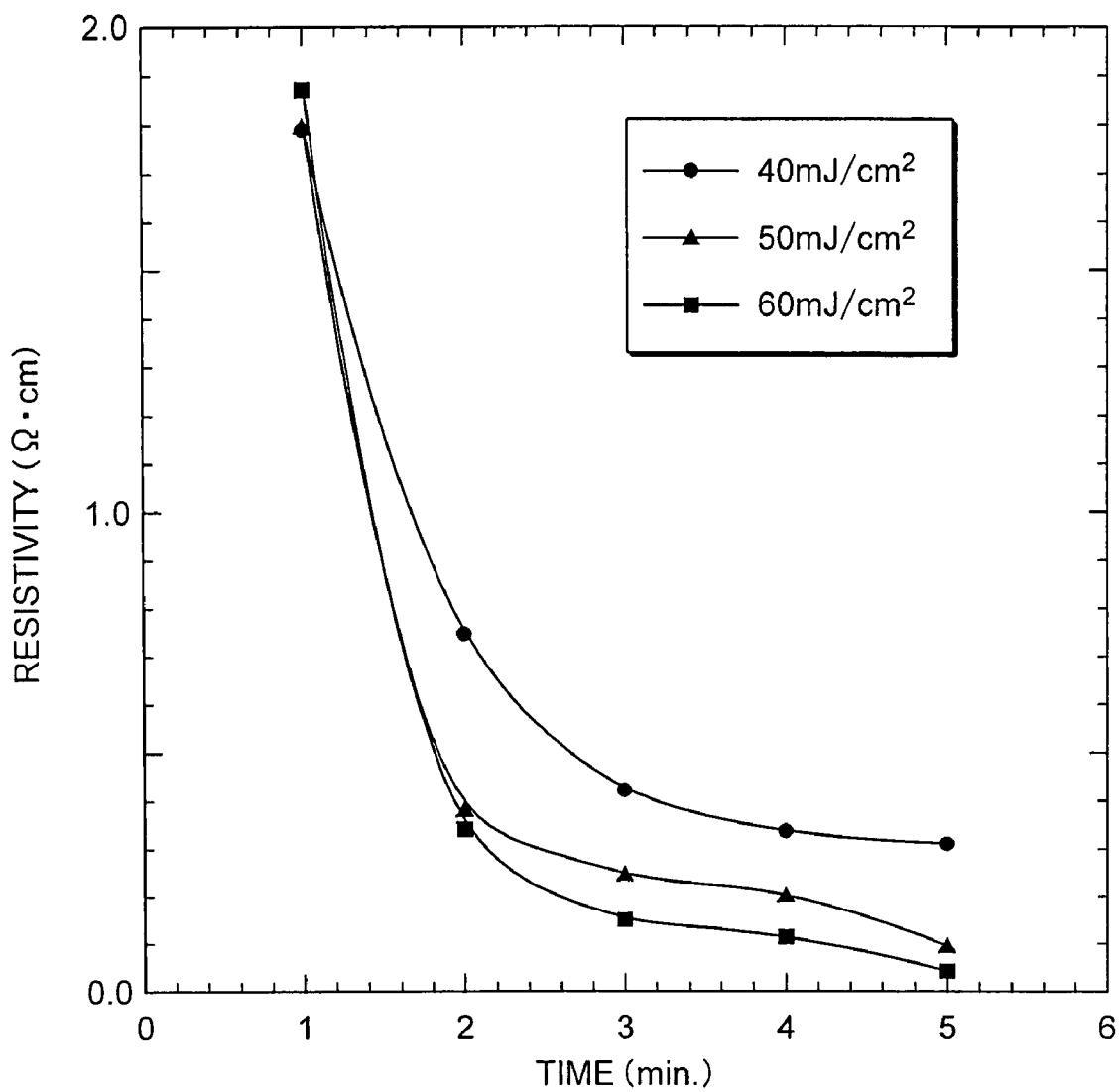
FIG. 3 is a characteristic diagram showing the results of measuring the relationship between the resistivity of a bolometer resistor and the irradiation time in the case where the irradiation energy of laser light irradiated onto the bolometer resistor is changed in the infrared sensor manufacturing process shown in FIG. 1C.

FIG. 3 is a characteristic diagram showing the results of measuring the relationship between the resistivity of the infrared sensor (bolometer resistor 4') and the irradiation time in the case where the irradiation energy of the laser light irradiated onto the bolometer resistor 4' is 40 mJ/cm$^2$, 50 mJ/cm$^2$, and 60 mJ/cm$^2$, respectively. At any irradiation energy, the electrical resistivity becomes 1Ω·cm or less when the irradiation time exceeds 2 minutes, and thus falls within the electrical resistivity range required for the material of the bolometer resistor.

Figure 4:
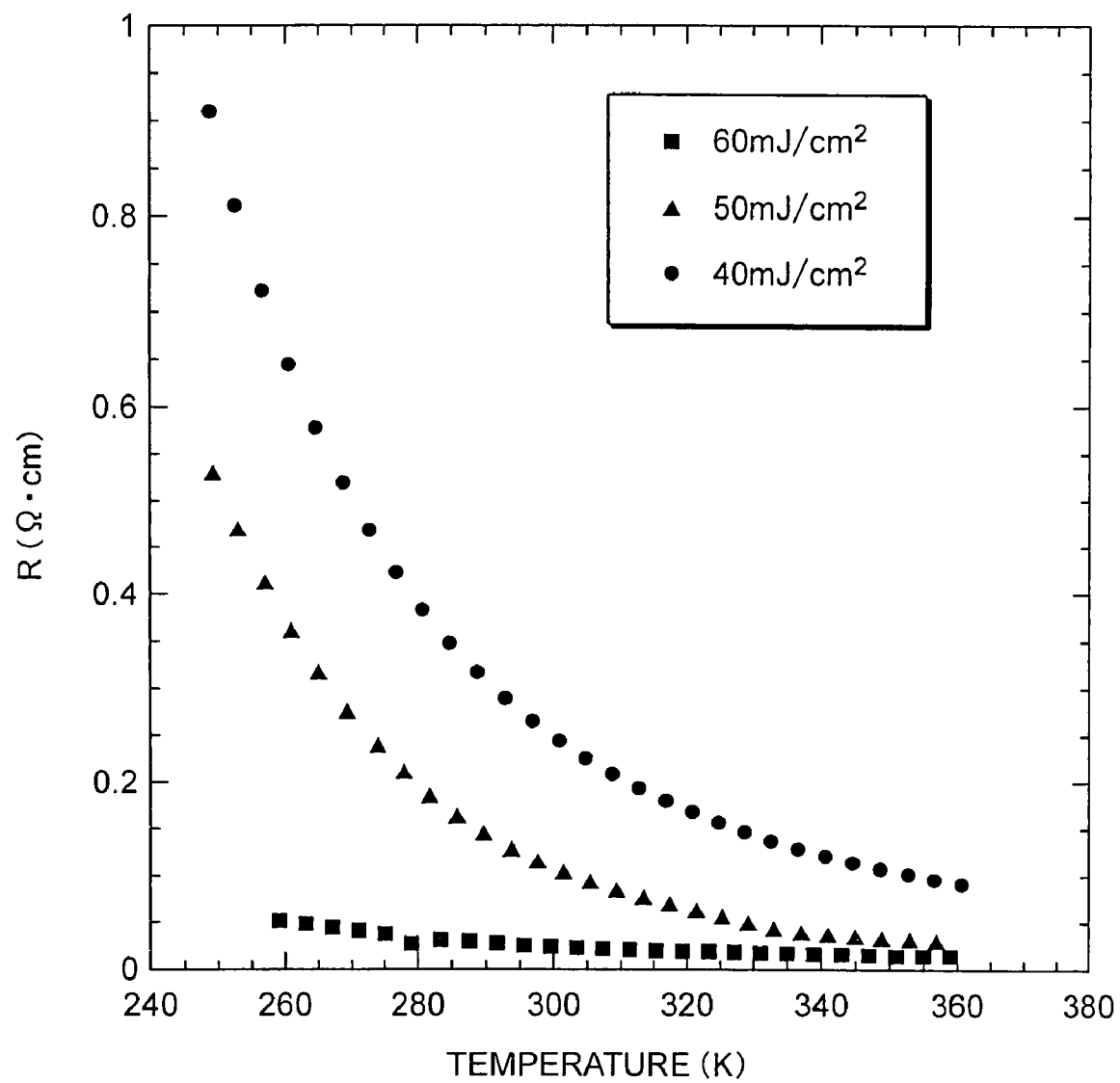
FIG. 4 is a characteristic diagram showing the results of measuring the temperature dependence of resistivity of a bolometer resistor in the case where the irradiation energy of laser light irradiated onto the bolometer resistor is changed in the infrared sensor manufacturing process shown in FIG. 1C.

FIG. 4 is a characteristic diagram showing the results of measuring the temperature dependence of resistivity of the infrared sensor (bolometer resistor 4') in the case where the irradiation energy of the laser light irradiated onto the bolometer resistor 4' is 40 mJ/cm$^2$, 50 mJ/cm$^2$, and 60 mJ/cm$^2$, respectively.

From the foregoing measurement results, it can be understood that the preferable irradiation energy range is 30 to 60 mJ/cm$^2$ in the manufacturing method according to this invention The infrared sensor according to this embodiment is superior to the infrared sensor disclosed in Patent Document 1 in the following points:

1. Using, as the material of each of the bridge structure and the protective layer, SiN or SiON having a better infrared absorptivity as compared with $SiO_2$, $TiO_2$, $Al_2O_3$, or the like, it is possible to improve the TCR.

2. The formation of the vanadium oxide thin film for forming the bolometer resistor is carried out by the sputtering method, i.e. not by the coating method. The coating method can reduce the number of processes, but cannot uniformly form a film on the rough surface of a substrate, and thus is not suitable for mass production. In contrast, the sputtering method can uniformly form a film regardless of the roughness of the surface of a substrate and thus is suitable for mass production.

3. The temperature reduction is realized by setting the temperature of the substrate to 350° C. or less as compared with conventional 400 to 500° C. or less.

It is readily understood that this invention is not limited to the foregoing embodiment, but various changes or modifications can be made without departing from the technical thought of this invention.

What is claimed is:

1. A method of manufacturing a bolometer-type infrared sensor that changes a temperature of a light-incident portion thereof by absorption of incident infrared light so as to change an electrical resistance value of a resistor by a temperature change, thereby outputting a signal indicative of a radiation intensity of the incident infrared light, said method comprising the steps of:
    forming a bridge structure of an insulating material on an insulating substrate;
    forming a vanadium oxide thin film on said bridge structure by a dry film forming method;
    irradiating laser light onto said vanadium oxide thin film to thereby change material properties thereof;
    forming said vanadium oxide thin film with the changed material properties into a predetermined pattern as said resistor; and
    forming a protective layer of an insulating material so as to cover said vanadium oxide thin film formed into the predetermined pattern and said bridge structure.

2. A method according to claim 1, wherein said dry film forming method is one of a sputtering method, a vacuum deposition method, and a CVD method.

3. A method according to claim 1, wherein said bridge structure and said protective layer are each in the form of one of an SiN thin film and an SiON thin film formed by a CVD method.

4. A method according to claim 1, wherein use is made, as said laser light, of laser light having a wavelength of 157 to 550 nm.

5. A method according to claim 1, wherein an irradiation energy of said laser light is set to 10 to 150 mJ/cm$^2$.

6. A method according to claim 1, wherein irradiation of said laser light is performed at a substrate temperature of 350° C. or less.

7. A method according to claim 1, wherein irradiation of said laser light is performed in a vacuum or in a mixed reducing gas atmosphere.

8. A method according to claim 4, wherein use is made, as said laser light, of laser light having a wavelength of 222 to 360 nm.

9. A method according to claim 5, wherein an irradiation energy of said laser light is set to 30 to 60 mJ/cm$^2$.

10. A method according to claim 6, wherein irradiation of said laser light is performed at a substrate temperature of room temperature.

* * * * *

UNITED STATES PATENT AND TRADEMARK OFFICE
CERTIFICATE OF CORRECTION

PATENT NO. : 7,781,030 B2
APPLICATION NO. : 11/710962
DATED : August 24, 2010
INVENTOR(S) : Tetsuo Tsuchiya et al.

It is certified that error appears in the above-identified patent and that said Letters Patent is hereby corrected as shown below:

On the title page item '(75) Inventors':

"Kumagai, Ibaraki (JP); Toshihito Sasaki, Tokyo (JP); Seiji Kurashina,"

should appear as

--Kumagai, Ibaraki (JP); Tokuhito Sasaki, Tokyo (JP); Seiji Kurashina,--

Signed and Sealed this
Twenty-eighth Day of June, 2016

Michelle K. Lee
*Director of the United States Patent and Trademark Office*